United States Patent [19]
Bir et al.

[11] 3,719,720
[45] March 6, 1973

[54] REMOVING OLIGOMERS FROM STYRENE VAPOR

[75] Inventors: Wallace G. Bir, Creve Coeur; Louis C. Tsang, St. Louis, both of Mo.

[73] Assignee: Monsanto Company, St. Louis, Mo.

[22] Filed: Aug. 16, 1971

[21] Appl. No.: 172,188

[52] U.S. Cl..............................260/669 A, 260/669 P
[51] Int. Cl..............................................C07c 15/10
[58] Field of Search........................260/669 A, 669 P

[56] References Cited

UNITED STATES PATENTS

| | | | |
|---|---|---|---|
| 2,555,940 | 6/1951 | Simms | 260/669 A |
| 3,340,160 | 9/1967 | Waldby | 260/669 A |
| 3,448,015 | 6/1969 | Rogers | 260/669 A |
| 3,553,248 | 1/1971 | Wakita et al. | 260/669 P |

*Primary Examiner*—Curtis R. Davis
*Attorney*—John W. Klooster et al.

[57] ABSTRACT

Process for reducing the concentration of styrene oligomers in a super-heated vapor stream composed of styrene monomer, organic solvent, styrene oligomers, and miscellaneous hydrocarbons normally present as low level impurities in commercial grade styrene monomer. The process involves contacting such a vapor feed with a liquid phase composed generally of the same ingredients and continuously separating the resulting liquid and vapor phase and withdrawing a stream of the liquid which becomes rich in oligomers.

5 Claims, 5 Drawing Figures

REMOVING OLIGOMERS FROM STYRENE VAPOR

BACKGROUND

In recent years there has been an increasing interest in the production of styrene polymers, especially homopolystyrene and the rubber modified graft copolymer of styrene polymerized on a preformed elastomeric substrate known commercially as impact polystyrene, by continuous mass polymerization techniques. In such techniques, the polymer is first produced by continuous mass polymerization and thereafter a stream of the polymer dispersed in styrene monomer (and sometimes other polymers) is devolatilized to remove unpolymerized monomer and low boiling volatile materials from the polymer. From the devolatilization apparatus, there is emitted a stream containing styrene monomer vapor. The quantity of styrene thus emitted in such stream is so significant that recovery procedures are economically a necessity.

Heretofore, a variety of styrene monomer recovery procedures have been employed. In general, the styrene monomer is condensed and recycled to the polymerization zone of the continuous process. Typically, over a period of time, however, the concentration of low molecular weight but volatile styrene oligomers, especially dimers and even trimers of styrene, tends to build up in a continuous system and it is necessary in order to maintain high standards of product quality to control or limit the amount of such oligomers returned from the devolatilization zone to the polymerization zone.

Heretofore, oligomer removal has been done by offline distillation. A typical procedure involves the collection of condensate from the devolatilization zone and the distillation thereof in a fractional distillation column which is capable of separating the oligomers from the monomers. In general, prior art oligomer separation techniques involve off-line techniques typically practiced continuously.

There has now been discovered a technique for in-line removal of oligomers from a stream of styrene-monomer rich vapor. The technique is relatively simple to utilize, can be conveniently incorporated into continuous styrene polymerization equipment (typically for handling vapor directly issuing from the devolatilization zone) and permits one to avoid the necessity for expenses and time delaying off-line separation procedures.

SUMMARY

The present invention is directed to a process for reducing the concentration of styrene oligomers in a super heated vapor feed stream composed of styrene monomer, organic solvent, styrene oligomers and miscellaneous hydrocarbons, normally present as low level impurities in commercial grade styrene monomer. Typically, the vapor feed stream comprises at least about 60 weight per cent styrene monomer, up to about 3 weight per cent styrene oligomers, and the balance up to 100 weight per cent of any given such stream being inert hydrocarbons boiling within $\pm 10°C$. of styrene at 760 mm Hg. The stream is typified by that obtained from the vacuum devolatilization step of a continuous mass styrene polymerization plant.

This vapor feed stream is typified by having a substantially constant sub-atmospheric pressure which is regulated by external control means. Typically, the pressure of the feed stream ranges from about 1 to 200 mm Hg. and the temperature typically ranges about 200° to 320° C. the conditions of pressure and temperatures for any given said stream being such that the stream is super heated (typically from about 215° to 280°C.).

The super heated vapor feed stream is charged to a stripping zone. In the stripping zone there is effected an intimate and turbulent mixing of the vapor feed stream with a liquid phase composed generally of the same ingredients as the vapor feed stream, but comprising generally different relative proportions of such components. After the vapor feed stream has been separated from the liquid phase, the equilibrium partial pressure of styrene oligomers in the resulting vapor feed stream is less than the partial pressure of styrene oligomers in the starting or charged vapor feed stream. The conditions of mixing or contacting of the vapor feed stream with the liquid phase are preferably such that a near approach to thermal and mass equilibrium is achieved between the vapor and the liquid phases.

In this contacting step, most of the super heat contained in the initially charged vapor feed stream is surrendered and utilized to vaporize a fraction of the styrene monomer, solvents, and miscellaneous hydrocarbons from the liquid phase. At the same time and concurrently a fraction of the oligomer content of the vapor feed stream is condensed into the liquid phase. Generally, the pressure within the mixing or contacting zone may range from about 1 to 200 mm Hg. absolute and the temperature may range from about 0° to 120°C. with the lower portion of these respective ranges being preferred to minimize coincidental styrene polymerization in the liquid phase.

An efficient separation of vapor phase from liquid phase is preferably effected and the resulting vapor is discharged as a vapor exit stream from the stripping or separating zone. The vapor discharged characteristically has a relatively low degree of super heat (preferably substantially no super heat) and a relatively low oligomer content as compared to the charged vapor feed stream.

The separated liquid is continuously recycled to the mixing or contacting zone. The vapor exit stream is subsequently externally condensed for return to the polymerization zone or for content and use by any convenient means which are generally conventional and outside the scope of the present invention. Within the separation or stripping zone, there is maintained a sufficient inventory of liquid for the effective mixing and contacting of vapor and liquid. This liquid inventory is achieved by the continuous controlled addition of a liquid feed stream to the stripping or separation zone. This liquid feed stream is composed of generally the same ingredients as the vapor feed stream but preferably has a relatively low oligomer content, typically and preferably less than about 5 weight per cent of the total liquid feed stream. This liquid feed stream can be considered to supply material for the vaporization requirements of the mixing contacting step between charged vapor and liquid in the stripping zone, as well as for the withdrawal requirements hereinafter discussed. The flow rate of the liquid feed stream charged to the stripping zone is typically controlled from a level control means in a separated liquid sump in the stripping zone itself.

The composition of the liquid in the mixing region of the stripping zone is generally such that the proportions of oligomers in such liquid is greater than that in the liquid feed stream charged to the mixing zone but less than that proportion required for equilibrium with the charged vapor feed stream. Such a proportion is maintained in the liquid phase in the mixing zone by the continuous controlled withdrawal of a fraction of the separated liquid from the mixing zone following contacting of the liquid with the charged vapor, as by an exit liquid stream. The flow rate of such an exit liquid stream is typically controlled by temperature means in a separated liquid sump in the bottom, for example, of the stripping zone. Temperature is a sufficiently good and reliable inferential measure of liquid oligomer content of liquid in the sump region referred to within a stripping zone employed in the present invention because of the maintenance of constant pressure conditions in the stripping zone.

DRAWINGS

The present invention is better understood by reference to the appended drawings wherein:

FIG. 1 diagrammatically illustrates the basic principles of the present invention;

DETAILED DESCRIPTION

Figure 1:
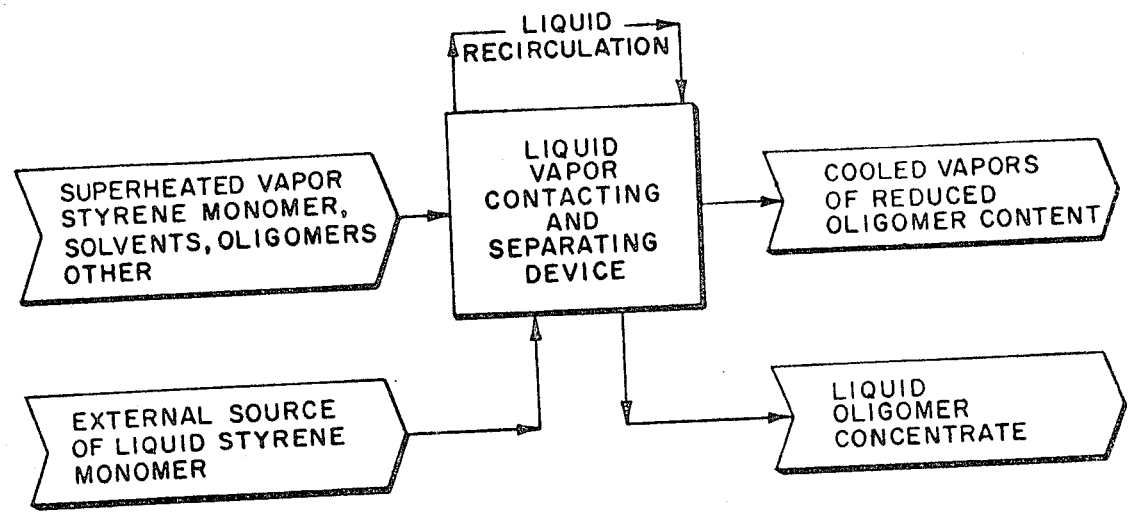

Referring to FIG. 1, it is seen that super heated styrene monomer rich vapor enters a liquid vapor contacting and separating device (sometimes herein for reference are conveniently referred to as a striping zone or a separating zone). In the device, intimate contact and mixing between the charged vapors and a liquid phase occurs. Such mixing is followed by separation of the phases for separate withdrawal from the device. An external liquid source rich in styrene monomer is also charged to the device.

Within the device, the entering super heated vapor stream surrenders most and preferably all of its super heat to the liquid phase which results in vaporization of a part of the styrene liquid feed, condensation of a large portion of the less volatile oligomers, and heating of the remaining liquid in the device.

Those skilled in the art will appreciate that under certain conditions, the need for an external source of styrene monomer rich liquid may be eliminated by the addition of a cooler or refrigeration means in the liquid recycle loop, should such a procedure provide better economics in a particular instance, due care being taken to control the oligomer content of the liquid phase in the contacting device as discussed earlier.

In general, the device employed provides up to a theoretical equivalent or one theoretical tray or equilibrium liquid vapor contacting stage, as those skilled in the art will readily appreciate. Because styrene oligomer possess appreciably lower volatility than styrene monomer, the degree of styrene oligomer separation provided is generally acceptable when applied to continuous styrene mass polymerization with the objective of providing a low equilibrium level of styrene oligomers in recycle monomer and with the further objective of providing a relatively low styrene monomer loss in the waste oligomer stream.

Figure 2:
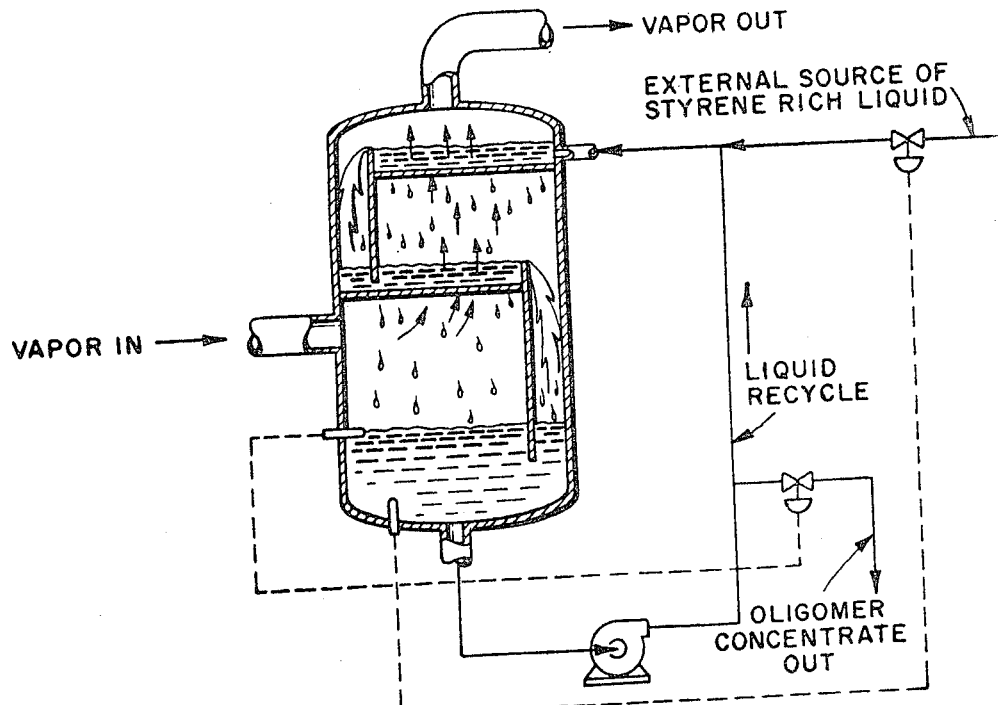
FIG. 2 illustrates an apparatus configuration adapted for use in the present invention over one range of pressure conditions.

Referring to FIG. 2, there is seen an apparatus configuration which is adapted for use in the practice of this invention when operating pressures in the range of from about 40 to 100 mm Hg. absolute. The device utilizes a pair of trays in the usual manner of a distillation column through and in which the input vapor stream passes and circulates in the manner shown by the arrows.

Figure 3:
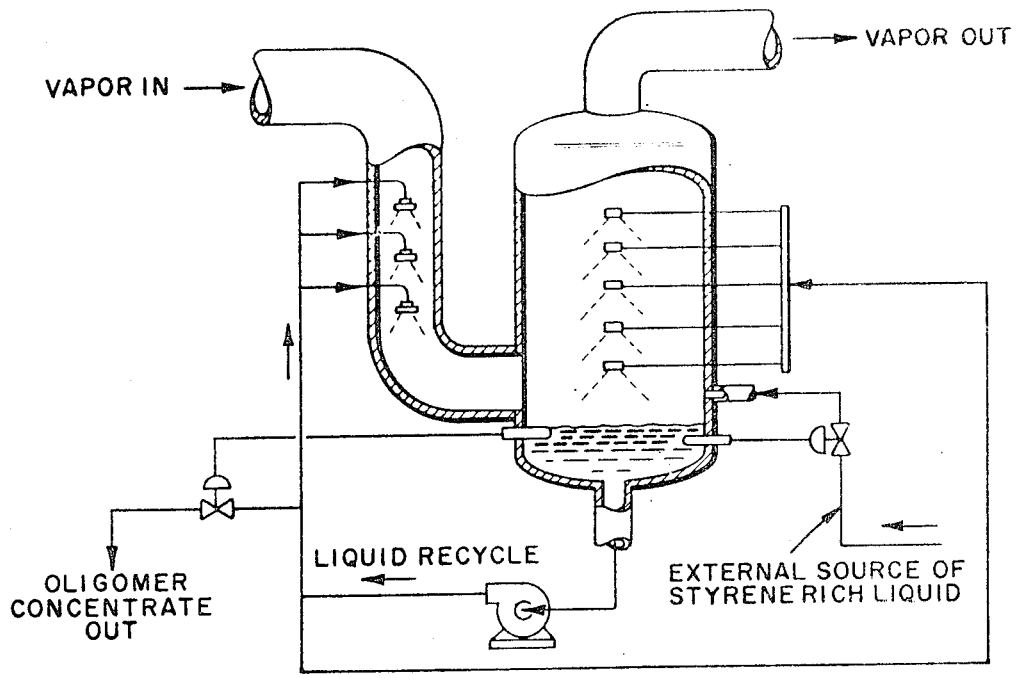
FIG. 3 illustrates another apparatus configuration adapted for use in the present invention over another range of pressure conditions.

FIG. 3 shows a configuration for a device adapted to be used in the process of the present invention at pressures of from about 1 to 40 mm Hg. Here, a series of cocurrent spaces are used to provide a vapor liquid mixing contacting zone.

Figure 4:
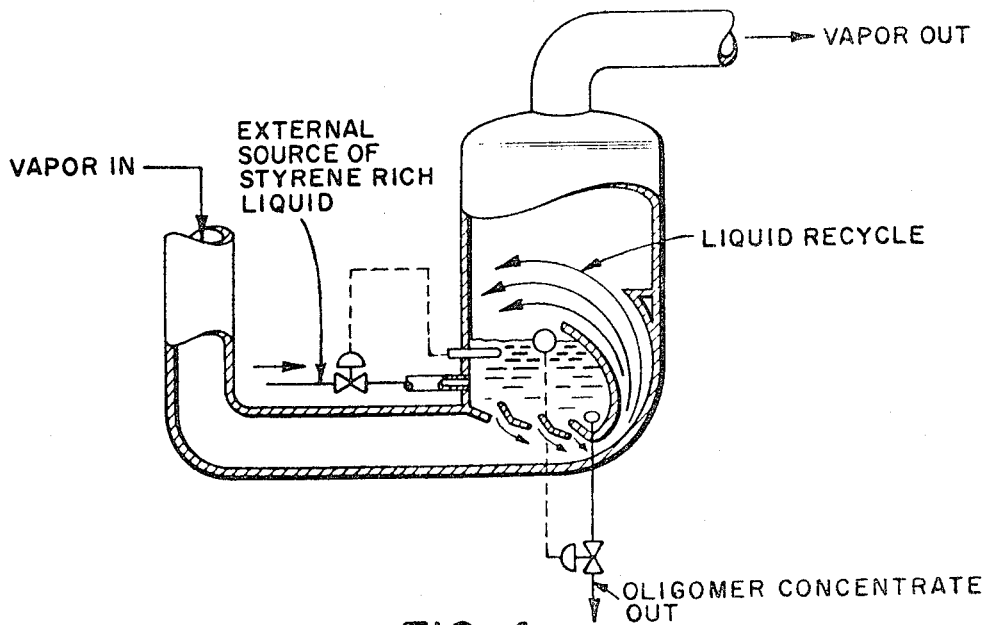
FIG. 4 illustrates still another apparatus configuration adapted for use in the present invention over still another range of pressure conditions.

In FIG. 4, there is shown a configuration for a device suitable for use in operating at pressures in the range of from about 100 to 200 mm Hg. Here, the vapor liquid contacting is accomplished within a fluid well.

In the device of FIG. 2, it is practical to obtain a close approach to liquid vapor equilibrium. In the device of FIG. 3, cocurrent spaces in a large settling chamber provide for good liquid vapor contact and separation with low vapor pressure loss. As economically justified, pressure loss in the device of FIG. 3 may be further reduced by use of bell-mouthed or conical vapor entry and exit transitions. In the device of FIG. 4 where higher pressures are useable, it is practical to employ a fraction of the pressure energy of the entering vapor stream to induce internal liquid recirculation and highly turbulent liquid vapor contacting. This type of device eliminates the need for an external liquid recirculation pump and piping at the expense of a larger pressure drop than occurs in either of the devices of FIGS. 2 and 3.

Figure 5:
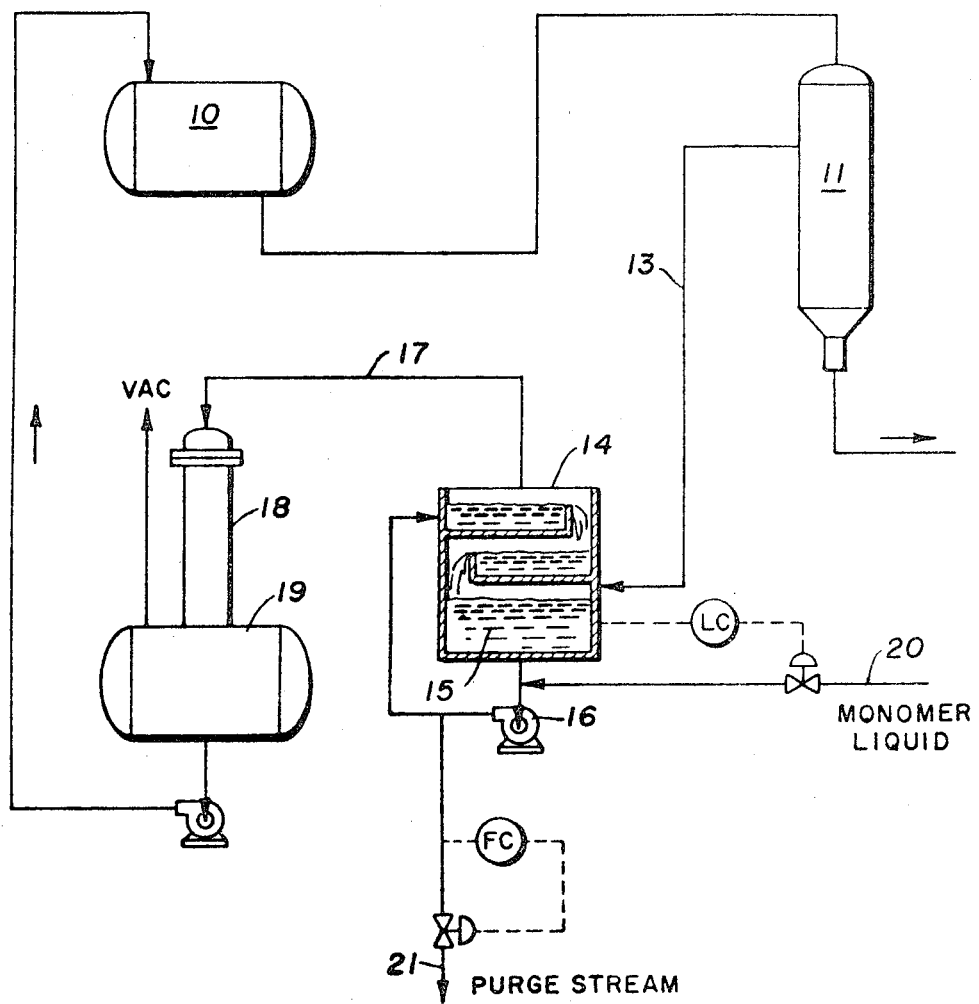
FIG. 5 is a schematic and diagrammatic flow diagram illustrating how the present invention is incorporated into a continuous styrene polymerization process.

Referring to FIG. 5, there is seen an embodiment of the present invention incorporated into a continuous mass polymerization process for making homopolystyrene. In that process (which does not constitute a part of the present invention), styrene monomer is mass polymerized continuously in a reactor 10 to a conversion of from about 60 to 75 weight per cent as desired. A melt comprising the product polymer dispersed and dissolved in the unpolymerized monomer is conveyed from reactor 10 to a devolatilizer 11 where substantially all of the monomer is removed except for a residual amount which is less than 1 per cent. The devolatilizer can be of the wiped film or falling strand type.

From devolatilizer 11, a vapor stream 13 is withdrawn and fed to a contacting device of the type illustrated in FIG. 2 herein. The stream moves upwardly through device 14 through trays filled with liquid. After separation from such liquid, the vapor exits from device 14 and passes through a pipe 17 to a condenser 18. The liquified condensate passes from condenser into a receiver 19, from whence it is pumped and recycled back to reactor 10.

As explained above, the liquid in the device 14 comprises a mixture of styrene monomer, inert hydrocarbons and styrene oligomers. The weight percentage of oligomers in such liquid is above the percentage of styrene oligomers in the vapor stream 13. The partial pressure of oligomers over the liquid in the contacting zone is less than the partial pressure of oligomers in the vapor stream 13. The quantity of such liquid in the contacting zone (as well, in effect, as the degree of contacting between such liquid and the vapor stream) is such that, after the vapor stream has passed therethrough in the contacting zone, the resulting vapor is substantially free of super heat.

Observe that after the contacting zone, there is the separating zone wherein liquid is separated from vapor. As illustrated in FIGS. 2 through 4, usually there is more than one contacting zone and one separating zone in a device used for the practice of this invention, although one such contacting zone and one such separating zone may be sufficient, depending upon use conditions.

Liquid from the contacting zones and the separating zones in device 14 is recirculated. Thus, the liquid passes from the region of the trays downwardly into a sump region and then is pumped back again into the contacting zone uppermost while maintaining the desired quantity of liquid in the contacting zone using a pump 16 and functionally associated piping.

To the liquid in device 14 is added continuously fresh liquid in a stream 20. Such stream comprises about 60 weight percent styrene monomer inert hydrocarbons, and not more than about 3 weight per cent styrene oligomers. The rate of addition is such as to reduce the amount of styrene oligomers in the resulting so-separated vapor below the amount of styrene oligomers in the charged vapor stream 13.

There is continuously removed from the sump region the desired purge stream of styrene oligomer concentrate at a rate such that the level of liquid in the sump region is maintained at a predetermined level.

Preferably, in one mode of operation, a styrene polymerization inhibitor is continuously and simultaneously added to the liquid in a device 14 at a rate sufficient to substantially completely prevent styrene polymerization in a device 14 at the particular operating conditions employed. The inhibitor used is chosen so as to have a molecular weight great enough to tend to keep the inhibitor out of the vapor phase and in the liquid phase. One particularly preferred such suitable inhibitor is t-butylcatecol. Addition rates for such an inhibitor are usually below 0.05 weight per cent, based on total weight of liquid.

Preferably, the styrene content of the charged vapor stream 13 is at least about 80 weight per cent styrene monomer. Preferably also, the vapor stream 13 is at a temperature in the range of from about 215° to 280°C. and at a pressure of from about 40 to 100 mm Hg. absolute. The mixing or contacting zone is also preferably at a pressure of from about 40 to 100 mm Hg. absolute.

For example, the temperature of the vapor in stream 13 is about 250°C. and the stream comprises about 1,740 pounds per hour styrene, about 17.4 pounds per hour of dimer, and about 8.7 pounds per hour of trimer. The temperature in device 14 is maintained at about 70°C. and the pressure at 52 mm Hg. absolute. The vapor stream exiting from device 14 through line 17 is at about 70°C. and comprises about 2,756 pounds per hour of styrene, about 0.8 pounds per hour of dimer, and about 0.01 pounds per hour of trimer. The fresh liquid charged through line 20 is at about 20°C. and comprises about 1,096 pounds per hour of styrene monomer. The purge stream out in line 21 is at about 70°C. and comprises about 80.0 pounds per hour of styrene monomer, about 16.6 pounds of dimer, and about 8.7 pounds per hour of trimer. Observe that oligomer level in the liquid in the device 14 is controlled satisfactorily without separate temperature regulating means.

Other and further variations and applications will be apparent to those skilled in the art from a reading of the present specification taken with the drawings. No limitations are to be implied from the foregoing illustrative example.

What is claimed is:

1. A continuous process for reducing the concentration of styrene oligomers in a stream of styrene monomer vapor and for concentrating such styrene oligomers in a liquid purge stream, said process comprising the steps of continuously and simultaneously:

A. contacting in at least one contacting zone a vapor stream with a liquid,
   1. said vapor stream comprising at least about 60 weight per cent styrene monomer, up to about 3 weight per cent styrene oligomers and the balance up to 100 weight per cent in any given such stream being inert hydrocarbons boiling within ± 10°C. of styrene at 760 mm Hg.; said stream being super heated at a temperature in the range of from about 200° to 320°C. and at a pressure of from about 1 to 200 mm Hg. absolute,
   2. said liquid being a styrene oligomer concentrate comprising a mixture of styrene monomer, said inert hydrocarbons and styrene oligomers, the weight percentage of oligomers in said liquid being above the said percentage of styrene oligomers in said stream,
   3. said contacting zone being at a pressure of from about 1 to 200 mm Hg., the partial pressure of oligomers over the liquid in said contacting zone being less than the partial pressure of oligomers in said vapor stream, and said contacting zone being at a temperature of from about 0° to 120°C.,
   4. the quantity of said liquid in said contacting zone being such that, after said vapor stream has passed therethrough in said contacting zone, the resulting vapor is substantially free of super heat, B. separating in at least one separating zone said resulting vapor from said liquid, and removing said resulting vapor from said liquid, C. circulating said liquid from said contacting zone and said separating zone to a sump region and back again to said contacting zone while maintaining the desired quantity of said liquid in said contacting zone,
D. adding into said liquid so circulating a fresh liquid stream comprising at least about 60 weight per cent styrene monomer, inert hydrocarbons, and not more than about 3 weight per cent styrene oligomers, the rate of said addition being such as to reduce the amount of styrene oligomers in said resulting so-separated vapor below the amount of styrene oligomers in said vapor stream charged to said contacting zone, and
E. removing from said sump region the desired purge stream of styrene oligomer concentrate at a rate such that the level of liquid in said sump region is maintained at a predetermined level.

2. The process of claim 1 wherein a styrene polymerization inhibitor is continuously and simultaneously charged to said liquid at a rate sufficient to substantially completely prevent styrene polymerization in said liquid.

3. The process of claim 2 wherein said inhibitor is t-butyl catecol.

4. The process of claim 1 wherein said vapor stream contains at least 80 weight per cent styrene.

5. The process of claim 1 wherein said vapor stream is at a temperature in the range from about 215° to 280°C. and at a pressure of from about 40 to 100 mm HgA, and the pressure in said mixing zone ranges from about 40 to 100 mm HgA.

* * * * *